United States Patent [19]

MacMillan

[11] 3,990,821

[45] Nov. 9, 1976

[54] SELF-LOCKING MOLD

[76] Inventor: Kenneth T. MacMillan, 4992 Wesleyan Woods Drive, Macon, Ga. 31204

[22] Filed: Nov. 25, 1975

[21] Appl. No.: 635,211

[52] U.S. Cl. .................................... 425/19; 425/23
[51] Int. Cl.² .......................................... B29H 5/04
[58] Field of Search .................. 425/11, 17, 18, 19, 425/21, 22, 23, 24, 25, 35, 46, 47

[56] References Cited
UNITED STATES PATENTS

| | | | |
|---|---|---|---|
| 1,388,255 | 8/1921 | Hardeman | 425/35 |
| 2,174,188 | 9/1939 | Heintz | 425/23 X |
| 2,272,231 | 2/1942 | Voth | 425/20 X |
| 2,567,985 | 9/1951 | Baker et al. | 425/23 |
| 2,812,547 | 11/1957 | Duerksen et al. | 425/23 |
| 2,826,783 | 3/1958 | Robbins | 425/25 |
| 3,137,032 | 6/1964 | MacMillan | 425/19 |
| 3,184,794 | 5/1965 | Sherkin | 425/19 |
| 3,233,284 | 2/1966 | MacMillan | 425/19 |
| 3,520,025 | 7/1970 | MacMillan | 425/23 |

*Primary Examiner*—J. Howard Flint, Jr.
*Attorney, Agent, or Firm*—Diller, Brown, Ramik & Wight

[57] ABSTRACT

This disclosure relates to a self-locking mold formed of a plurality of matrices movable between open and closed positions thereof with the latter position defining a generally annular chamber, means for pressurizing an object within the annular chamber, and means in the form of a pair of locking plates responsive to the pressurization for locking the matrices in the closed position thereof.

30 Claims, 5 Drawing Figures

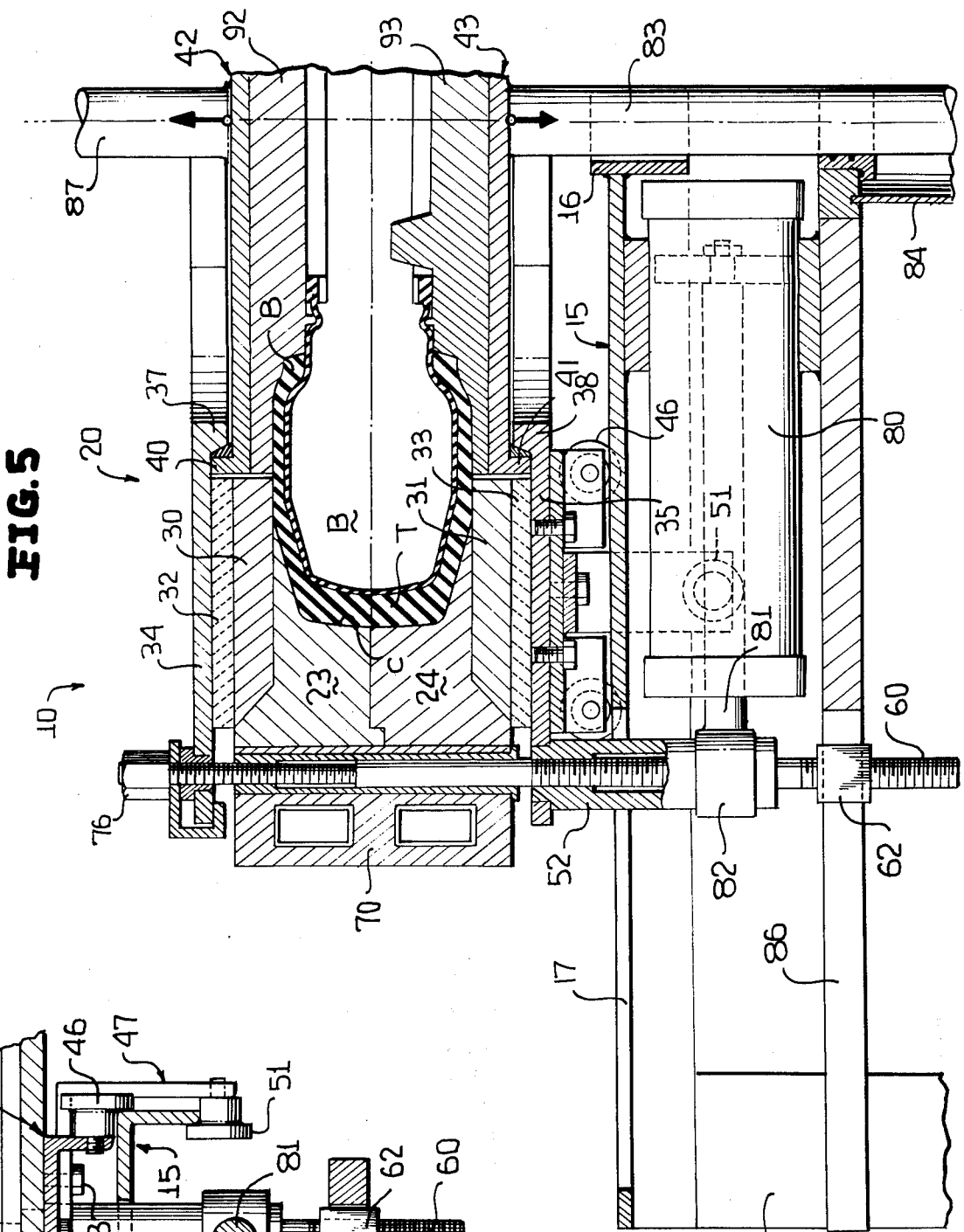

SELF-LOCKING MOLD

The present invention is directed to an apparatus or machine for molding objects, and though primarily directed to a machine for retreading tires the invention is equally applicable to equivalent machines having relatively movable components which in any particular position must be maintained securely locked together and/or machine components must be maintained properly aligned or centered in the locked position thereof.

A primary object of this invention is to provide a novel molding apparatus in which matrix portions are clamped between a pair of clamping plates having oppositely axially directed locking lugs which cooperate with like though axially oppositely directed locking lugs of relatively movable locking plates whereupon in the engaged position of the lugs internal pressure typical of that utilized during a retreading operation precludes inadvertent or accidental disassembly of the mold components.

A further object of this invention is to provide a novel apparatus of the type heretofore defined wherein the locking plates additionally carry bead aligner wheels and novel screw means are provided for moving at least one of the bead aligner wheels at a rate less than the motion of one of the clamping plates to assure the proper centering of the bead aligner wheels relative to any size matrix portions or matrix segments.

A further object of this invention is to provide a novel machine of the type heretofore described including means for heating the matrix portions, and means for moving the heating means relative to one of the clamping plates at a differential speed rate such that irrespective of the width of matrix portions utilized during a particular retreading operation the heating means will always be centered relative thereto.

Still another object of this invention is to provide means for moving the matrix portions radially or toward the axis of the annular chamber between open and closed positions thereof.

Another object of this invention is to construct the locking lugs of the locking plates and the clamping plates of dissimilar material to prevent galling or alternatively to insert between the latter lugs replaceable wear rings.

With the above and other objects in view that will hereinafter appear, the nature of the invention will be more clearly understood by reference to the following detailed description, the appended claims and the several views illustrated in the accompanying drawings.

IN THE DRAWINGS

FIG. 4 is a fragmentary sectional view taken generally along line 4—4 of FIG. 3, and illustrates the manner in which one of the matrices is carried by a rail of the machine for rolling motion radially toward and away from a vertical axis.

FIG. 5 is a fragmentary sectional view similar to FIG. 3, and illustrates the manner in which the locking lugs are interlocked under internal pressure tending to urge the locking plates axially away from each other.

Figure 2:
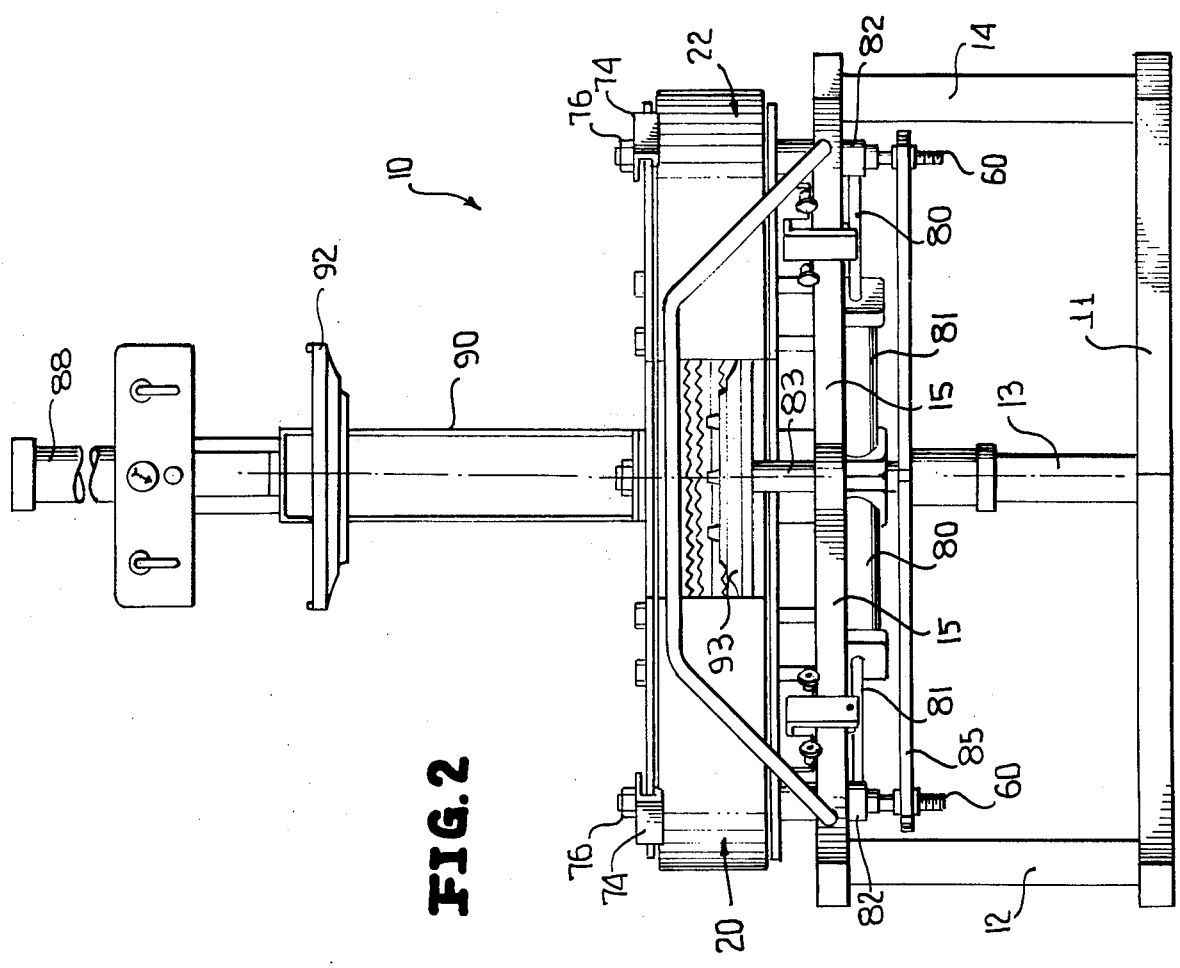
FIG. 2 is a front elevational view with a portion thereof broken away for clarity, and illustrates opposed axially relatively movable bead aligner wheels and locking plates.
Figure 3:
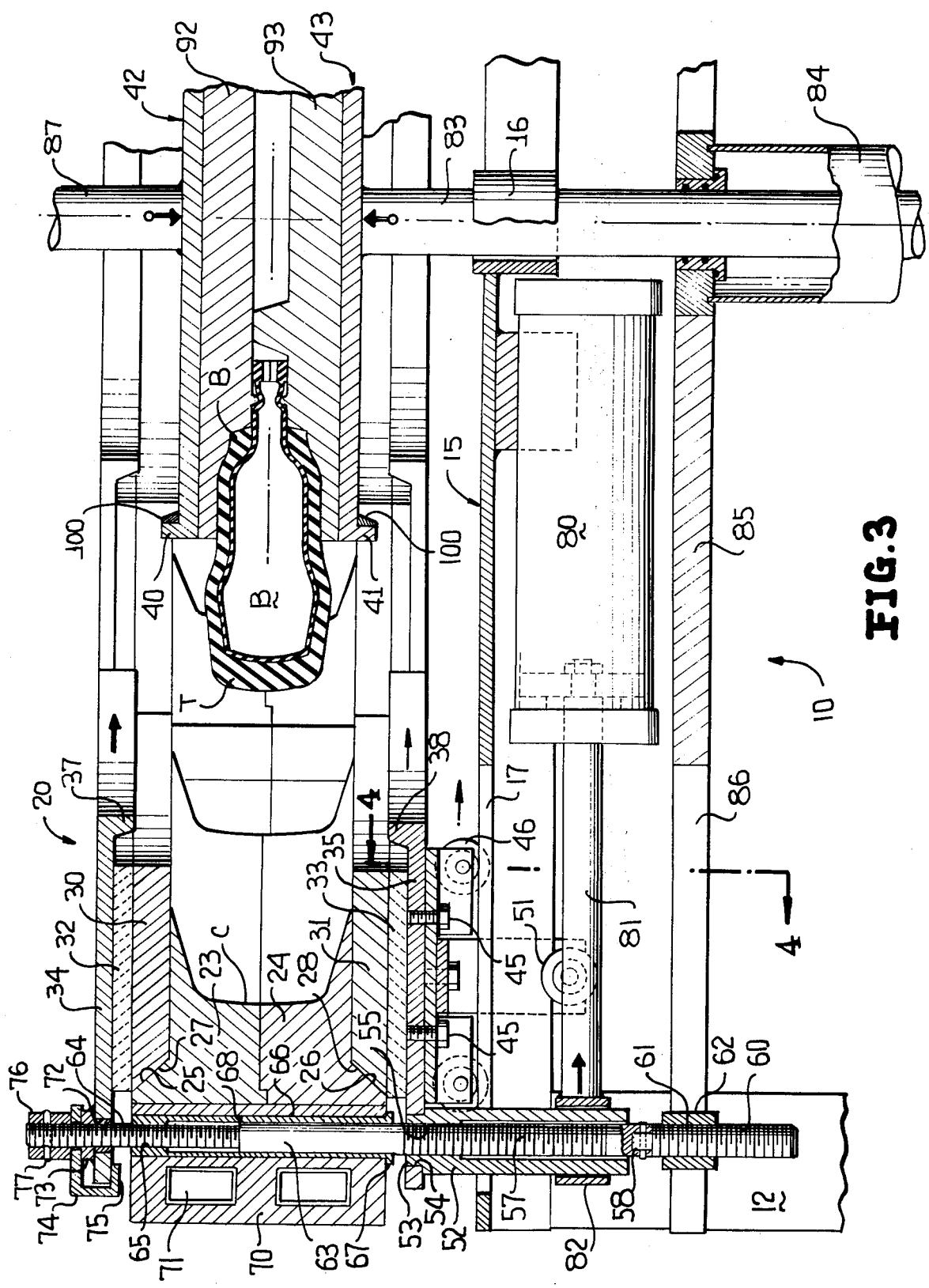
FIG. 3 is an enlarged fragmentary sectional view taken generally along line 3—3 of FIG. 1, and illustrates a tire located by the bead aligner wheels, the matrices in their open position, and cooperative locking lugs carried by clamping plates of the matrices and the locking plates.

A novel retreading, treading or similar machine constructed in accordance with this invention is generally designated by the reference numeral 10 and includes a base 11 (FIG. 2) having a plurality of vertical legs 12, 13 and 14. The legs 12–14 are connected at their upper ends to inverted U-shaped rails 15 (FIGS. 2, 3, 4 and 5) with the rails 15 at their innermost ends being connected to a sleeve 16 (FIGS. 3 and 5). The rail 15 connected between the leg 13 and the sleeve 16 is not illustrated in the drawings but its connection is identical to that shown best in FIGS. 3 and 5 relative to the manner in which the rail 15 is connected between the leg 12 and the sleeve 16. Each rail 15 is defined by a pair of dependent arms (unnumbered in FIG. 4) and a bight portion therebetween which includes a slot 17 (FIGS. 3 and 5).

Figure 1:
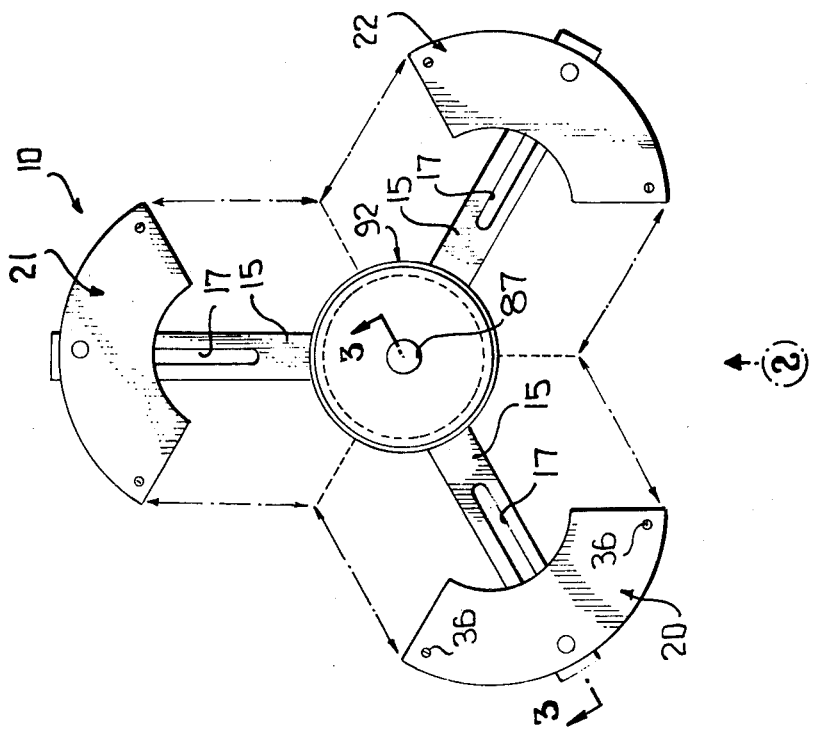
FIG. 1 is a schematic top plan view of a mold which includes three matrices movable radially inwardly and outwardly between respective closed and open positions.

The purpose of the rails 15 is to support three identical matrices 20 through 22 (FIG. 1), and the foregoing description of the matrix 20 is equally applicable to the matrices 21 and 22.

The matrix 20 includes a pair of matrix segments or portions 23, 24 which when in the closed position define an annular chamber C (FIG. 5) in conjunction with the like matrix portions 23, 24 of the remaining matrices 21, 22. Respective inclined surfaces 25, 26 of the matrix portions 23, 24 meet with like inclined surfaces 27, 28 of respective side plates 30, 31. Resting against each side plate 30, 31 is a piece of insulating material 32, 33 respectively. Resting against each of the insulating plates 32, 33 is a pressure or clamping plate 34, 35, respectively. A plurality of bolts 36 (FIG. 1) secure the clamping plate 34 to the insulation plate 32 and the side plate 30 while similar bolts (not shown) secure the clamping plate 35 to the insulation plate 33 and the side plate 31. At an inboard edge of each of the clamping plates 34, 35 there is provided an annular extending axially directed locking lug or bead 37, 38, respectively, which respectively lockingly cooperate with axially oppositely directed locking lugs or beads 40, 41 of a pair of respective locking plates 42, 43 in a manner which will be described more fully hereinafter.

A generally inverted U-shaped carriage 44 (FIG. 4) is secured by bolts 45 (FIG. 3) to the underside of the plate 35 and four flanged rollers 46 carried by the carriage 44 ride upon the rail 15 in the manner best illustrated in FIG. 4. An inverted U-shaped bracket 47 is secured by bolts 48 to the carriage 44 and flanged rollers 51 carried thereby engage the rail 15 in the manner best illustrted in FIG. 4. The four flanged rollers 46 make certain that the carriage 44 travels perfectly linearly along the rail 15 while the two flanged rollers 51 preclude cocking or upward lifting of the carriage 44 as well as, of course, the entire matrix 20 carried by the carriage 44.

A nut 52 having an outside diameter slightly less than the width of the slot 17 passes therethrough and a reduced end portion 53 is received in an aperture 54 of the clamping plate 35 and is rigidly secured to the latter by welding or the like. The nut 52 has a threaded portion 55 which threadedly engages a threaded portion 56 of a screw 57. The screw 57 has connected by a universal or swivel connection 58 another threaded portion 60 which is fitted into a threaded portion 61 of another nut 62, the function of which will be described more fully hereinafter. The screw 57 further includes an unthreaded cylindrical portion 63 and an uppermost threaded portion 64 which is in threaded engagement with threads 65 of another nut or sleeve 66 having a lower flange 67. The nut or sleeve passes through a bore 68 of an external heater 70 which has suitable ports 71 through which hot water or steam may pass, although the latter might be eliminated and instead the heater 70 can simply be an electrical heater with the ports 71 being substituted for by calrods or other similar resistance heaters. The sleeve 66 supports the heater 70 by virtue of the flange 67 but in lieu thereof the sleeve or nut 66 can be more positively connected to the heater 70, although the present construction provides for the rapid removal of the heater 70 from the nut 66 by simply an upward movement of the heater 70 when components thereabove have been removed. The threaded portion 67 passes through an unthreaded and slightly larger bore 72 of a fitting 73 welded or otherwise secured in an opening (unnumbered) of the clamping plate 34. The threaded portion 64 also freely passes through an unthreaded opening (unnumbered) of a bracket 74 which has a lower flange 75 underlying a peripheral edge (unnumbered) of the clamping plate 34. The nut 76 is fixed by a pin 77 to the uppermost terminal end (unnumbered) of the screw 57. Upon imparting rotation to the nut 76 the heater 70 will move upwardly by virtue of the threaded engagement between the threaded portion 64 of the screw 57 and the threaded portion 65 of the nut 66. By the same token, upward threaded motion imparted to the screw 57 will raise the clamping plate 54 and the plates 32, 30 secured thereto by virtue of the threaded connection between the threaded portion 55 of the nut 52 and the threaded portion 56 of the screw 57. The same upward threading motion of the screw 56 will also move the nut 62 by virtue of the threaded engagement betweeen the thread 61 thereof and a threaded extension 60 of the screw means or screw 57. However, the pitch of the threaded portions 64, 60 is one-half the pitch of the threaded portion 56 so that the motion imparted to the clamping plate 34, be it upward or downward, will be at twice the speed of the motion imparted to the heataing means 70 and the nut 62, for reasons to be described more fully hereinafter.

The matrix 20 is moved its open and closed positions by means of hydraulic fluid appropriately introduced into a fluid cylinder 80 (FIGS. 3 and 4) secured in a conventional manner to the rail 15. A rod 81 of the fluid cylinder 80 is welded to a sleeve 82 which surrounds the nut 52. Thus motion of the rod 81 to the right, as viewed in FIG. 3, will draw the segment 20 to the right, whereas opposite motion imparted to the rod 81, as viewed in FIG. 5, will move the mold segment 20 to the left. The lower locking plate 43 is carried by a rod 83 which passes through the sleeve or collar 16 and enters a fluid cylinder 84 which in turn is supported by three arms 85 each connected to one of the nuts 62 in the manner illustrated best in FIG. 3. Each of the arms 85 includes an elongated slot 86 along which the nut 62 can move although the nut 62 is confined by the slot 86 against rotation.

The upper locking plate 32 is likewise carried by a rod 87 of a fluid cylinder 88 (FIG. 2) supported in cantilever fashion by vertical support 90 forming a portion of the overall machine framework. Thus, by suitably introducing fluid into or withdrawing fluid from the cylinders 84, 88, the locking plates 42, 43 can be moved toward or away from each other.

Conventionally removably secured to the locking plates 42, 43 are conventional bead aligner wheels 92, 93 which are designed to contact beads B of a tire T designed to be retreaded within the chamber C under the influence of a pressurized medium introduced into an annular bladder B1 through suitable ports and valves, not shown, although disclosed in a manner described and illustrated in applicant's corresponding application entitled AUTOMATIC PRODUCTION MOLDS Ser. No. 391,816, filed Aug. 27, 1973.

OPERATION

Assuming that the matrices 20 through 22 are in the open positions (FIGS. 1 and 3) and that the rods 83, 87 have been retracted into their respective cylinders 84, 88 a distance beyond either FIGS. 3 or 5, the tire T with the bladder B1 seated therein is positioned upon the bead aligner wheel 93 and by supplying suitable fluid to the cylinders 84 and 88 the rods 83, 87, respectively, move toward and to the position shown in FIG. 3, at which time the tire beads B are seated upon the bead aligner wheels to accurately locate the tire T with its centerline commensurate and coincident with that of the centerline between the matrix portions 23, 24. At this point fluid is introduced into the cylinders 80 for retracting each of the rods 81 thereof, thus moving each carriage 44 and the segment 20 through 23 associated therewith radially inwardly to a position at which the lugs 37 are more radially inboard than the lugs 40 as well as the lugs 38 being more radially inboard than the lugs 41 associated with each of the segments or matrices 20 through 22. This relationship is shown in FIG. 5, although at this point in the description of the operation of the machine the locking plates 42, 43 along with the associated bead aligner wheels 92, 93 have not been moved away from each other. Once the latter position is reached, the tire T is compressed and readily fits within the chamber C after which the pistons 83, 87 are retracted into their respective cylinders 84, 88 bringing the lugs 37, 40 and 38, 41 into the interlocked relationship. Once the locking plates 42, 43 and the respective clamping plates 34, 35 have been interlocked in the position shown in FIG. 5, a fluid media under pressure is introduced into the interior of the bladder B1 in a conventional manner. This fluid may be air, steam, water, oil, a non-combustible, non-expandable and relatively non-compressible liquid, etc., which tends to urge the bead aligner wheels 92, 93 and the locking plates 42, 43 relatively away from each other. This force tending to bias the locking plates 42, 43 away from each other merely increases the clamping action between the clamping plates 34, 35 and the respective locking plates 42, 43 since the same force also tends to urge the segments 20 through 22 radially outwardly. Thus there is achieved excellent locking between the flanges 37, 38 and 40, 41 of the various segments 20 through 22 and the locking plates 42, 43. Once the tire T has been cured, the pressure internally of the bladder B1 is relieved, the locking plates 42, 43 are moved toward each other, and the matrices 20 through 22 are moved radially outwardly from the position shown in FIG. 5 to that shown in FIG. 3 by outward motion of the rods 81 relative to each of the cylinders 80.

The screw 56 is designed to serve several different purposes, one of which assures that the matrix portions 23, 44 are brought into intimate bearing engagement against the innermost surface (unnumbered) of the heating means 70. This is achieved by virtue of the fact that as the screw 56 is turned to move the plate 34, 35 relatively toward each other the surfaces 25, 27 and 26, 28 ride against each other urging the matrix portions 23, 24 radially outwardly into intimate contact with the inner surface of the heating means 70, thereby assuring that the heat of the latter is transferred efficiently to the matrix portions 23, 24 of the matrices 20 through 22.

Inasmuch as the pitch of the threaded portion 60 is one-half the pitch of the threaded portion 56, the rotation of the screw 57 will move the cylinder 84 through the arms 85 upwardly or downwardly at one-half the rate of the motion of the uppermost clamping plate 32 by virtue of the rotation of the threaded portion 56 of the screw 57 relative to the threads 55 of the nut 52. Therefore, the lowermost bead aligner wheel 93 which is carried by the locking plate 43 which is in turn carried by the rod 83 coupled to the cylinder 84 will never move upwardly above a centerline or center plane passing horizontally through the chamber C. This assures that the tire T will be centered when it is inserted in the chamber C and also prevents the tire from "scuffing" on one side or the other side thereof during the closing operation. Moreover, this also insures that the locking plates 42, 43 clear the locking lugs 37, 38 of each of the clamping plates 34, 35 when the segments 20 through 22 are being opened or closed.

A like type centering action takes place between the heating means 70 and the pressure plate 34 because the pitch of the threaded portion 64 is likewise one-half the pitch of the threaded portion 56 of the screw 57. Thus whether the screw is rotated to raise or lower the pressure plate 34 and the heating means 70, the latter moves at one-half the speed of the pressure plate 34, thereby assuring that for any width of matrix portions 23, 24 the heating chamber 70 will always be centered along the centerline of the chamber C. Stated otherwise, the heating chamber 70 is always maintained exactly midway between the pressure plates 34, 35 irrespective of the distance of these plates from each other as might be changed by differences in the size of the matrix portions 23, 24 or the insertion of spacers therebetween.

In further keeping with this invention, the locking plates 42, 43 are constructed from metal different from the metal of the pressure plates or clamping plates 34, 35 to prevent "galling." The pressure plates 34, 35 may be, for example, constructed from steel while the locking plates may be constructed from bronze, or alternatively from steel carrying bronze wear rings 100. Although the wear rings 100 and the lugs 40, 41 might be of integral material, it is obviously advantageous to construct the wear rings 100 as separate elements in order that they might be replaced as worn.

Although this invention has been described relative to the use of a bladder B1, it is also to be understood that the bladder B1 can be eliminated and internal pressure exerted against the tire T in the closed position of the segments 20 through 21 will assure the bead being properly applied against the bead aligner wheels 92, 93. At the end of a curing cycle this pressure is simply released and the cylinders 84, 88 are pressurized to remove the respective rods 87, 83 toward each other allowing the rods 81 of the cylinders 80 to again open the molds by motion of the matrix segments 20 through 21 radially outwardly.

The present machine 10 may be operated manually, automatically or semi-automatically by use of appropriate valves to operate the cylinders 80, 84, 88, etc. Moreover, in order to make certain that heat is not wasted, the heating chamber 70 associated with each segment is preferably totally insulated.

While preferred forms and arrangement of parts have been shown in illustrating the invention, it is to be clearly understood that various changes in details and arrangement of parts may be made without departing from the scope and spirit of this disclosure.

I claim:

1. Apparatus for molding objects comprising a plurality of matrices, means for relatively moving said matrices between open and closed positions thereof, said matrices in the closed position thereof defining a generally annular chamber, means for pressurizing an object within said annular chamber, and means responsive to the pressurization for locking said matrices in the closed position thereof.

2. The apparatus as defined in claim 1 wherein said moving means move said matrices toward and away from the axis of said annular chamber during respective closing and opening motion.

3. The apparatus as defined in claim 1 wherein said locking means include a pair of relatively movable locking plates.

4. The apparatus as defined in claim 1 wherein said locking means include a pair of relatively movable locking plates, and means for relatively moving said locking plates generally transversely of the motion of said matrices.

5. The apparatus as defined in claim 1 including a pair of relatively movable plates adapted to receive therebetween a portion of the object to be molded in said annular chamber, means for relatively moving said plates toward and away from each other in directions generally transverse to the motion of said matrices, and said locking means being carried at least in part by each of said plates.

6. The apparatus as defined in claim 1 wherein each of said matrices is defined by a pair of matrix portions, each pair of matrix portions being sandwiched between a pair of clamping plates, means for relatively moving each pair of clamping plates toward and away from each other, a pair of relatively movable bead aligner wheels, means for relatively moving said bead aligner wheels, and means coupling one of said clamping plates to a lower one of said bead aligner wheel moving means for moving said one clamping plate at a speed rate less than that of said lower one bead aligner wheel moving means.

7. The apparatus as defined in claim 1 wherein each of said matrices is defined by a pair of matrix portions, each pair of matri portions being sandwiched between a pair of clamping plates, first screw means of a first pitch for relatively moving each pair of clamping plates toward and away from each other, a pair of relatively movable upper and lower opposed bead aligner wheels, at least one of said bead aligner wheels being carried by a rod telescopically received in a fluid cylinder, and second screw means of a pitch differing from said first pitch coupling said first screw means to said cylinder for moving one of said clamping plates relative to and at a speed rate less than that of said cylinder thereby maintaining accurate alignment of said locking means irrespective of the size of said matrix portions.

8. The apparatus as defined in claim 1 wherein each of said matrices is defined by a pair of matrix portions, each pair of matrix portions being sandwiched between a pair of clamping plates, means for heating each of said matrices, first screw means of a first pitch for relatively moving each pair of clamping plates toward and away from each other, and second screw means of a pitch differing from said first pitch coupling said heating means to said first screw means for moving said heating means at a differential speed rate compared to that of said clamping plates thereby assuring centereing of said heating means irrespective of the size of said matrix portions.

9. The apparatus as defined in claim 2 wherein said locking means include a pair of relatively movable locking plates.

10. The apparatus as defined in claim 2 wherein said locking means include a pair of relatively movable locking plates, and means for relatively moving said locking plates generally transversely of the motion of said matrices.

11. The apparatus as defined in claim 2 including a pair of relatively movable plates adapted to receive therebetween a portion of the object to be molded in said annular chamber, means for relatively moving said plates toward and away from each other in directions generally transverse to the motion of said matrices, and said locking means being carried at least in part by each of said plates.

12. The apparataus as defined in claim 2 wherein each of said matrices is defined by a pair of matrix portions, each pair of matrix portions being sandwiched between a pair of clamping plates, means for relatively moving each pair of clamping plates toward and away from each other, a pair of relatively movable bead aligner, wheels means for relatively moving said bead aligner wheels, and means coupling one of said clamping plates to a lower one of said bead aligner wheel moving means for moving said one clamping plate at a speed rate less than that of said lower one bead aligner wheel moving means.

13. The apparatus as defined in claim 2 wherein each of said matrices is defined by a pair of matrix portions, each pair oof matrix portions being sandwiched between a pair of clamping plates, first screw means of a first pitch for relatively moving each pair of clamping plates toward and away from each other, a pair of relatively movable upper and lower opposed bead aligner wheels, at least one of said bead aligner wheels being carried by a rod telescopically received in a fluid cylinder, and second screw means of a pitch differing from said first pitch coupling said first screw means to said cylinder for moving one of said clamping plates relative to and at a speed rate less than that of said cylinder thereby maintaining accurate alignment of said locking means irrespective of the size of said matrix portions.

14. The apparatus as defined in claim 2 wherein each of said matrices is defined by a pair of matrix portions, each pair of matrix portions being sandwiched between a pair of clamping plates, means for heating each of said matrices, first screw means of a first pitch for relatively moving each pair of clamping plates toward and away from each other, and second screw means of a pitch differing from said first pitch coupling said heating means to said first screw means for moving said heating means at a differential speed rate compared to that of said clamping plates thereby assuring centering of said heating means irrespective of the size of said matrix portions.

15. The apparatus as defined in claim 3 wherein said matrices and locking plates have cooperative locking lugs engageable in the closed position of said matrices for precluding relative radial separation between said matrices and locking plates.

16. The apparatus as defined in claim 15 wherein said matrices locking lugs project oppositely to the direction of said locking plate locking lugs.

17. The apparatus as defined in claim 15 wherein said matrices include a plurality of matrix portions sandwiched between clamping plates, and said clamping plates carry at least some of said locking lugs.

18. The apparatus as defined in claim 15 including a bead aligner wheel carried by each locking plate for engaging the beads of tires adapted to be molded with said annular chamber.

19. The apparatus as defined in claim 16 wherein said matrices include a plurality of matrix portions sandwiched between clamping plates, and said clamping plates carry at least some of said locking lugs.

20. The apparatus as defined in claim 17 including a bead aligner wheel carried by each locking plate for engaging the beads of tires adapted to be molded with said annular chamber.

21. An apparatus for maintaining proper alignment between components of a mold comprising a pair of matrix portions, a pair of clamping plates for clamping said matrix portions therebetween, heating means exteriorly of said matrix portions for heating the latter, screw means for supporting one of said clamping plates and said heating means, said screw means being a single screw having first and second threaded portions of differing pitch, first nut means coupling the threaded portion of lesser pitch to said heating means, and second nut means coupled to the threaded portion of greater pitch whereby upon rotation of said screw said one clamping plate moves at a rate of speed greater than that of said heating means.

22. The apparatus as defined in claim 21 wherein said first and second nuts are fixed against rotation, and rotation imparted to said screw moves the latter relatively axially of said first and second nuts.

23. The apparatus as defined in claim 21 wherein said screw rotates freely in non-threaded relationship to said one clamping plate.

24. The apparatus as defined in claim 22 wherein said screw rotates freely in non-threaded relationship to said one clamping plate.

25. The apparatus as defined in claim 23 including an opening in said one clamping plate through which said screw passes freely and in non-threaded relationship, and means coupling said screw to said one clamping plate adjacent said opening.

26. An apparatus for maintaining proper alignment between components of a mold comprising a pair of clamping plates receiving therebetween matrix portions defining an annular chamber adapted to receive a tire to be molded, a pair of bead aligner wheels in opposed relationship to each other adapted to contact the beads of a tire to properly locate the same in said annular chamber, a fluid cylinder and rod coupled to at least one of said bead aligner wheels for imparting motion thereto, a screw supporting one of said clamping plates, said screw having first and second threaded portions of differing pitch, first nut means coupling the threaded portion of lesser pitch to said fluid cylinder, and second nut means coupled to the threaded portion of greater pitch whereby upon rotation of said screw said one clamping plate moves at a rate of speed greater than that of said fluid cylinder and the at least one bead aligner wheel carried by the rod thereof to maintain proper centering of said at least one bead aligner wheel and said annular chamber irrespective of the size of said matrix portions.

27. The apparatus as defined in claiam 26 wherein said first and second nuts are fixed against rotation, and rotation imparted to said screw moves the latter relatively axially of said first and second nuts.

28. The apparatus as defined in claim 26 wherein said screw rotates freely in non-threaded relationship to said one clamping plate.

29. The apparatus as defined in claim 28 wherein said screw rotates freely in non-threaded relationship to said one clamping plate.

30. The apparatus as defined in claim 28 including an opening in said one clamping plate through which said screw passes freely and in non-threaded relationship, and means coupled said screw to said one clamping plate adjacent said opening.

\* \* \* \* \*